(12) United States Patent
Caraway et al.

(10) Patent No.: US 9,375,980 B2
(45) Date of Patent: Jun. 28, 2016

(54) ADHESIVE EXTRUSION FOR DYNAMICALLY VULCANIZED THERMOPLASTIC ELASTOMER LAMINATES

(75) Inventors: Gregory S. Caraway, Houston, TX (US); Porter C. Shannon, Seabrook, TX (US); Adriana S. Silva, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 484 days.

(21) Appl. No.: 12/838,076

(22) Filed: Jul. 16, 2010

(65) Prior Publication Data
US 2012/0015182 A1 Jan. 19, 2012

(51) Int. Cl.
*B29C 47/06* (2006.01)
*B32B 25/00* (2006.01)
(Continued)

(52) U.S. Cl.
CPC ........... *B60C 1/0008* (2013.04); *B29C 47/0019* (2013.01); *B29C 47/065* (2013.01); *B29C 47/263* (2013.01); *B29C 47/56* (2013.01); *B32B 27/08* (2013.01); *B32B 27/18* (2013.01); *B60C 5/14* (2013.01); *B29C 47/0004* (2013.01); *B29C 47/0026* (2013.01); *B29C 47/067* (2013.01); *B29C 2947/92704* (2013.01); *B29C 2947/92714* (2013.01); *B29C 2947/92876* (2013.01); *B29K 2021/003* (2013.01); *B29K 2995/0067* (2013.01); *B29K 2995/0069* (2013.01); *B29L 2030/008* (2013.01); *B32B 2250/24* (2013.01); *B32B 2270/00* (2013.01); *B32B 2274/00* (2013.01); *B32B 2305/72* (2013.01);
(Continued)

(58) Field of Classification Search
None
See application file for complete search history.

(56) References Cited

U.S. PATENT DOCUMENTS 5,910,544 A * 6/1999 Ozawa et al. .................. 525/178
6,582,786 B1 * 6/2003 Bonk et al. .................... 428/35.7
(Continued)

FOREIGN PATENT DOCUMENTS

EP 0 722 850 7/1996
EP 0 857 761 1/2000
(Continued)

OTHER PUBLICATIONS

Pearlbond®. Product Information [online]. The Lubrizol Corporation, 2012 [retrieved on Mar. 25, 2014]. Retrieved from the Internet: <URL: http://www.merquinsa.com/content/p_info/pearlbond3. aspx>.*

(Continued)

*Primary Examiner* — Jeffrey Wollschlager
(74) *Attorney, Agent, or Firm* — Nancy T. Krawczyk

(57) ABSTRACT

A coextrusion process for coextruding a thermoplastic elastomer with two outer layers of adhesive to form a film, and a laminate comprising a plurality of layers including an adhesive layer, a sublayer and a barrier layer. The barrier layer comprises a dynamically vulcanized thermoplastic elastomer composition present in one or more plies of the barrier layer. The sublayer comprises a first ply of a first adhesive composition joining the barrier layer and a second ply, and the adhesive layer comprises the second ply, which is vulcanizable with diene-based rubber. The sublayer of the adhesive can be laid down in contact with the relatively hot thermoplastic elastomer to moderate the temperature of the outer layer of the adhesive, whereby the outer layer of the adhesive at least is protected from scorching and can be co-vulcanized with rubber in a tire building process.

12 Claims, 2 Drawing Sheets

(51) Int. Cl.
- *B32B 37/12* (2006.01)
- *B60C 1/00* (2006.01)
- *B29C 47/00* (2006.01)
- *B29C 47/26* (2006.01)
- *B29C 47/56* (2006.01)
- *B32B 27/08* (2006.01)
- *B32B 27/18* (2006.01)
- *B60C 5/14* (2006.01)
- *B29L 30/00* (2006.01)
- *B29K 21/00* (2006.01)

(52) U.S. Cl.
CPC  *B32B 2307/7242* (2013.01); *B32B 2307/7265* (2013.01); *B32B 2597/00* (2013.01); *B60C 2005/145* (2013.04); *Y10T 428/269* (2015.01); *Y10T 428/2848* (2015.01)

(56) References Cited

U.S. PATENT DOCUMENTS

| | | |
|---|---|---|
| 2007/0031661 A1 | 2/2007 | Kanenari |
| 2009/0038729 A1 | 2/2009 | Soeda et al. |
| 2009/0308517 A1 | 12/2009 | Nohara et al. |

FOREIGN PATENT DOCUMENTS

| | | |
|---|---|---|
| EP | 0 969 039 | 1/2000 |
| EP | 1 666 242 | 6/2004 |
| EP | 1 930 152 | 6/2008 |
| EP | 2 172 349 | 4/2010 |
| JP | 08-244402 | 9/1996 |
| JP | 10-025375 | 1/1998 |
| JP | 2007-098843 | 4/2007 |
| JP | 2007098843 A * | 4/2007 |
| WO | WO 2007050236 A1 * | 5/2007 |

OTHER PUBLICATIONS

Comprehensive VAROX® Peroxide Accelerator Product Guide. Vanderbilt Chemicals, LLC, 2014 [retrieved on Apr. 10, 2015]. Retrieved from the Internet: <URL: http://www.vanderbiltchemicals.com/ee_content/Documents/Technical/VAROX_Product_Guide_Rubber_Web.pdf>.*

* cited by examiner

ADHESIVE EXTRUSION FOR DYNAMICALLY VULCANIZED THERMOPLASTIC ELASTOMER LAMINATES

SUMMARY OF THE INVENTION

The present invention relates to thermoplastic elastomer compositions particularly useful for tire and other industrial rubber applications and processes for producing such compositions. More particularly, the present invention is directed to a method of extruding thermoplastic elastomeric compositions wherein adjacent adhesive layers are not thermally compromised by the extrusion.

BACKGROUND OF THE INVENTION

EP 722850B1 discloses a low-permeability thermoplastic elastomer composition that is superior as a gas-barrier layer in pneumatic tires. This thermoplastic elastomer composition comprises a low-permeability rubber, such as brominated poly(isobutylene-co-paramethylstyrene), referred to hereinafter as BIMS, dispersed in a low-permeability thermoplastic matrix, such as polyamide or a blend of polyamides. In EP 857761A1 and EP 969039A1, the viscosity ratio of the thermoplastic matrix and the dispersed rubber phase was specified both as a function of the volume fraction ratio and, independently, to be close to a value of one to produce a high concentration of small particle size vulcanized rubber particles dispersed in a thermoplastic phase. EP 969039A1 further disclosed that small particle size rubber dispersed in a thermoplastic resin matrix is important to achieve acceptable durability of the resulting composition, particularly where used as innerliners in pneumatic tires.

Compositions exhibiting low gas permeability performance (i.e., functioning as a gas barrier) composed of thermoplastic resin/thermoplastic resin-based blends such as a high density polyethylene resin and nylon 6 or nylon 66 (HDPE/PA6.66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same, have been disclosed. An application regarding the use of such a composition as the innerliner layer of a tire is disclosed in Japanese Patent Application No. 7-55929. However, since these materials are thermoplastic resin/thermoplastic resin blends, while they are superior in gas barrier performance, they lack flexibility, and therefore, such films are subject to failure if they are used in a vehicle tire which is subject to significant stress and flexing.

Further, there are also examples of the use of a thermoplastic elastomer composed of a rubber and a thermoplastic resin for use as an innerliner or in a tire; see, Japanese Patent Application No. 8-183683, but in general, a flexible material of the type disclosed therein and having superior durability has low heat resistance. With a thermoplastic elastomer using a thermoplastic resin having a melting point less than the tire vulcanization temperature as a matrix, when the tire vulcanization bladder is released at the end of the tire vulcanization cycle, the tire inside surface is subject to appearance defects due to the thermoplastic resin sticking to or rubbing against the vulcanization bladder.

In preparing tire innerliners for assembly with a tire carcass, a thermoplastic elastomer is co-extruded together with an adhesive layer in two layers in cylindrical shapes. If the adhesive layer arranged at the outside is too tacky, it will stick to the take-up roll at the time of shaping and seriously degrade the workability. Further, this requires the insertion of release paper, Mylar® film, etc., between the tubular materials at the time of take-up, which is a problem in terms of cost and transport weight. On the other hand, if the adhesive layer is insufficiently tacky, at the time of tire production, there is the problem that the thermoplastic elastomer layer will end up peeling off from the tire carcass thereby making formation impossible. See U.S. Publication No. 2007-0031661A1. Further, the thermoplastic elastomer requires an extruder processing melt temperature in excess of the vulcanization temperature of the adhesive at which the adhesive is later cured with the rubber in the tire to adhere the innerliner to the tire carcass; there is the problem of the occurrence of scorching or other excessive thermal contamination from the thermoplastic elastomer in the process of co-extrusion with the thermoplastic elastomer composition at a high temperature, resulting in crosslinking, gel formation and/or degradation in the adhesive layer, reducing its efficacy in the tire.

There is a continuing need to improve the properties of dynamically vulcanized thermoplastic barrier films based on nylon and elastomers, particularly where the use of carbon black in the elastomer phase is avoided.

The limitations of the prior art approaches to achieving improved performance of the desirable compositions comprising a small particle size rubber domain dispersed in a thermoplastic matrix, the composition exhibiting improved gas or fluid barrier properties and desirable levels of strength and durability suitable for use in tires and hose applications suggest that there is a continuing need for improvements, as have been accomplished by use of the processes and compositions of the present invention.

SUMMARY OF THE INVENTION

In accordance with an embodiment of the invention, a process comprises coextruding a thermoplastic elastomer with two outer layers of adhesive to form a film. In an embodiment, a sublayer of the adhesive is laid down in contact with the relatively hot thermoplastic elastomer, and serves to moderate the temperature of the outer layer of the adhesive laid down over the sublayer, whereby the outer layer of the adhesive at least is protected from scorching and can be co-vulcanized with rubber in a tire building process.

In an embodiment, the process comprises: supplying respective melt streams of a barrier composition and first and second adhesive compositions, wherein the first and second adhesive compositions are the same or different; coextruding the melt streams to form a laminated extrudate comprising a plurality of layers comprising an adhesive layer, a sublayer and a barrier layer; wherein the barrier composition comprises a dynamically vulcanized thermoplastic elastomer composition present in one or more plies of the barrier layer; and wherein the sublayer comprises a first ply formed from the melt stream of the first adhesive composition, wherein the adhesive layer comprises a second ply formed from the melt stream of the second adhesive composition, wherein the first ply adhesively joins the barrier layer and the second ply, and wherein the second ply is vulcanizable with diene-based rubber.

In an embodiment, the melt stream of the barrier composition is supplied at a temperature of from 210° C. to 260° C., the melt stream of the first adhesive composition at a temperature less than 210° C., and the melt stream of the second adhesive composition at a temperature less than 180° C. In an embodiment, the sublayer is at least partially cured and the adhesive layer is undercured. In an embodiment, the process further comprises introducing the melt streams onto a mandrel in a die stack in a sequence wherein the melt stream of the barrier composition is introduced onto the mandrel, the melt stream of the first adhesive composition onto the barrier composition steam, and the melt stream of the second adhesive composition onto the first adhesive composition stream.

In an embodiment, the thermoplastic elastomer composition in the barrier layer comprises a thermoplastic resin comprising a polyamide, as a continuous phase, and a rubber composition dispersed therein, as a dispersed phase, wherein the rubber composition comprises a halogenated copolymer of isobutylene and paramethylstyrene.

In an embodiment, the adhesive layer comprises a vulcanization cure package. In an embodiment, the sublayer is free of the vulcanization cure package or comprises less vulcanization cure package than the adhesive layer, and the adhesive layer is free of oxirane oxygen, e.g., less than 1 or less than 0.1 wt %, or comprises less oxirane oxygen than the sublayer. In an embodiment, the adhesive layer has a self-tack of less than 5N, and the adhesive layer and sublayer have a total thickness of from 5 to 200 microns.

In an embodiment, the first adhesive composition comprises a total of 100 parts by weight of a thermoplastic elastomer component containing 50 parts by weight or more of an epoxy-modified styrene-butadiene-based block copolymer so that an oxirane oxygen content is at least 1 wt %, and from 30 to 200 parts by weight of a tackifier component, wherein the sublayer is co-cured with the barrier layer. In an embodiment, the tackifier component comprises a resin selected from the group consisting of aliphatic resins, aromatic modified aliphatic resins and combinations thereof.

In an embodiment, the second adhesive composition comprises a total of 100 parts by weight of a thermoplastic elastomer component, from 30 to 200 parts by weight of a tackifier component, and from 0.1 to 15 parts by weight of a vulcanization cure package per 100 parts by weight of the thermoplastic elastomer component. In an embodiment, the tackifier component comprises a resin selected from the group consisting of aliphatic resins, aromatic modified aliphatic resins and combinations thereof.

In another embodiment of the invention, a laminate comprises the laminated extrudate produced according to the process described above wherein the barrier layer is dynamically vulcanized and the adhesive layer is co-curable with diene-based rubber.

In another embodiment of the invention, the process further comprises adhering the adhesive layer to a surface of a tire carcass to form an innerliner in a tire.

In another embodiment of the invention, a pneumatic tire is produced according to the process described above wherein the adhesive layer of the laminate is co-cured with the rubber surface of the tire carcass.

In another embodiment of the invention, a laminate comprises: a plurality of layers comprising an adhesive layer, a sublayer and a barrier layer; wherein the barrier layer comprises a dynamically vulcanized thermoplastic elastomer composition present in one or more plies of the barrier layer; wherein the sublayer comprises a first ply of a first adhesive composition adhesively joining the barrier layer and a second ply, and wherein the sublayer has a thickness of from 5 to 25 microns; wherein the adhesive layer comprises the second ply formed of a second adhesive composition, wherein the second ply is vulcanizable with diene-based rubber, wherein the adhesive layer has a self-tack of less than 5N, and wherein the adhesive layer and the sublayer have a total thickness of from 5 to 200 microns.

In an embodiment of the laminate, the thermoplastic elastomer composition in the barrier layer of the laminate comprises a thermoplastic resin comprising a polyamide, as a continuous phase, and a rubber composition dispersed therein, as a dispersed phase, wherein the rubber composition comprises a halogenated copolymer of isobutylene and paramethylstyrene. In an embodiment of the laminate, the adhesive layer comprises a vulcanization cure package. In an embodiment, the sublayer is free of the vulcanization cure package or comprises less of the vulcanization cure package than the adhesive layer, and the adhesive layer is free of oxirane oxygen, e.g., less than 1 or less than 0.1 wt %, or comprises less oxirane oxygen than the sublayer.

In an embodiment, the first adhesive composition in the laminate comprises an at least partially cured mix of a total of 100 parts by weight of a thermoplastic elastomer component containing 50 parts by weight or more of an epoxy-modified styrene-butadiene-based block copolymer so that an oxirane oxygen content is at least 1 wt %, and from 30 to 200 parts by weight of a tackifier component, and wherein the sublayer is co-cured with the barrier layer. In an embodiment, the tackifier component comprises a resin selected from the group consisting of aliphatic resins, aromatic modified aliphatic resins and combinations thereof.

In an embodiment, the second adhesive composition in the laminate comprises an undercured mix of a total of 100 parts by weight of a thermoplastic elastomer component, from 30 to 200 parts by weight of a tackifier component, and from 0.1 to 15 parts by weight of a vulcanization cure package. In an embodiment, the tackifier component comprises a resin selected from the group consisting of aliphatic resins, aromatic modified aliphatic resins and combinations thereof. In an embodiment, the second adhesive composition comprises the mix or is prepared by undercuring the mix.

DETAILED DESCRIPTION

Figure 1:
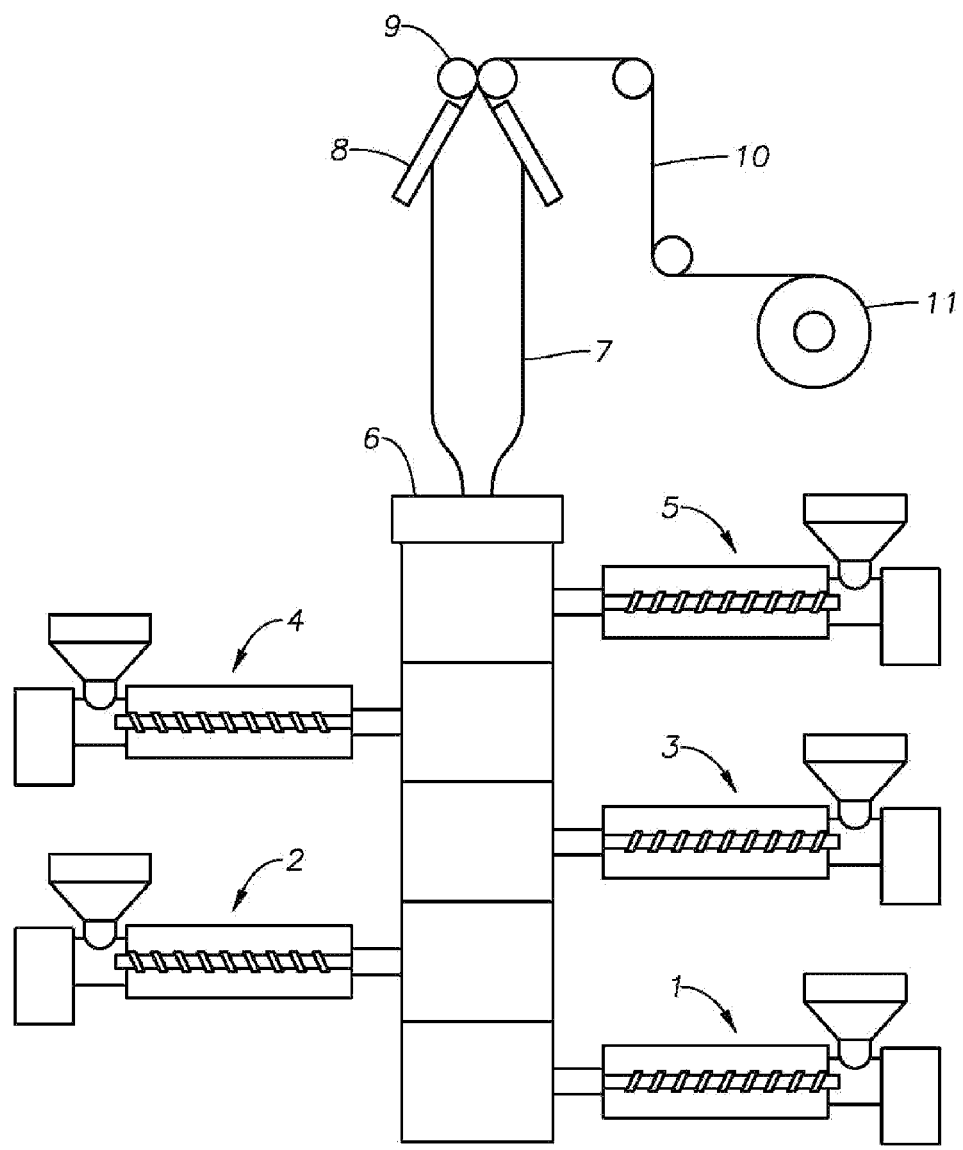
FIG. 1 is a schematic view of an extruder line for making a multilayer blown film according to an embodiment.

Preferred applications of the present invention relate to thermoplastic elastomer compositions for tire innerliner and barrier films, more particularly to thermoplastic elastomer compositions exhibiting excellent durability and impermeability to fluids such as air, as well as to liquids. Preferred compositional features are directed to enhanced or maximized content of dispersed halogenated, preferably brominated, isobutylene elastomers in the form of vulcanized particles dispersed in a continuous polyamide thermoplastic matrix. Additionally, particularly preferred aspects of the invention relate to efficient mixing processes suitable for producing a thermoplastic elastomer composition capable of providing a rubber domain comprising small sized particles while such domains are also highly extensible and elastic. Furthermore, the invention includes processes for producing pneumatic tires and hoses using the above compositions. The preferred elastomer exhibits low permeability and is preferably a polymer such as halogenated isobutylene-containing elastomers and particularly preferred are brominated elastomers, especially brominated isobutylene-co-paramethylstyrene polymers; especially preferred are bromobutyl elastomers exhibiting high content of the structure illustrated hereinafter below; and also preferred are commercial bromobutyl elastomers, or blends thereof with one or more of the aforementioned brominated elastomers with one another or with other polymers.

Throughout the entire specification, including the claims, the following terms shall have the indicated meanings:

Polymer may be used to refer to homopolymers, copolymers, interpolymers, terpolymers, etc. Likewise, a copolymer may refer to a polymer comprising at least two monomers, optionally with other monomers. All molecular weights are weight average unless otherwise noted.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)."

Substituted refers to the substitution of at least one hydrogen of the chemical compound or constituent.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

The present invention in various embodiments comprises a process of coextruding a thermoplastic elastomer with an adhesive in an outer layer and a sublayer.

Thermoplastic Elastomer—Elastomer Component

The primary elastomer of the thermoplastic elastomer comprises at least one halogenated $C_4$ to $C_7$ isoolefin-containing rubber. Typically, the rubber is present in a composition with a thermoplastic resin described hereinbelow, in a weight ratio of rubber to resin of about 55/45 to 80/20; preferably about 60/40 to about 75/25; more preferably about 65/35 to about 75/25. Halogenated rubber is defined as a rubber having at least about 0.1 mole % halogen, such halogen selected from the group consisting of bromine, chlorine and iodine. Preferred halogenated rubbers useful in this embodiment include halogenated homopolymers or copolymers. These polymers can be described as polymers of a $C_4$ to $C_7$ isoolefin derived unit, such as isobutylene derived unit, and at least one other polymerizable unit. In one embodiment, the halogenated polymer is a butyl-type rubber or branched butyl-type rubber, especially brominated versions of these elastomers.

Butyl rubbers are typically prepared by reacting a mixture of monomers, the mixture having at least (1) a $C_4$ to $C_7$ isoolefin monomer component with (2) a multiolefin monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. In one embodiment, the isoolefin is preferably an isomonoolefin. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene and dichlorostyrene are also suitable for homopolymerization or copolymerization in butyl rubbers. One embodiment of the butyl rubber polymer useful in an embodiment is obtained by reacting 95 to 99.5 wt % of isobutylene with 0.5 to 8 wt % isoprene, or from 0.5 wt % to 5.0 wt % isoprene in yet another embodiment.

Halogenated butyl rubber is produced by the halogenation of the butyl rubber product described above. Halogenation can be carried out by any means, and the embodiments herein are not limited by the halogenation process. In one embodiment, the butyl rubber is halogenated in hexane diluent at from 4° C. to 60° C. using bromine ($Br_2$) or chlorine ($Cl_2$) as the halogenation agent. Post-treated halogenated butyl rubber can also be used, as disclosed in U.S. Pat. No. 4,288,575. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

Another useful embodiment of butyl rubber is halogenated, branched or "star-branched" butyl rubber. In one embodiment, the star-branched butyl rubber ("SBB") is a composition comprising butyl rubber and a polydiene or block copolymer. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the embodiments are not limited to the type of polydiene or branching agent used to make the SBB.

The SBB used may be halogenated. In one embodiment, the halogenated star-branched butyl rubber ("HSBB") comprises a butyl rubber, either halogenated or not, and a polydiene or block copolymer, either halogenated or not. In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

Other useful butyl rubbers are isoolefin/para-alkylstyrene polymers that include random polymers comprising a $C_4$ to $C_7$ isoolefin and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90 wt % of the para-isomer. The "halo" group can be any halogen, desirably chlorine or bromine, most preferably bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin polymers can include monomers selected from the group consisting of isobutylene or isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Preferred isoolefin polymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Desirable styrenic monomers in the isoolefin copolymer include styrene, methylstyrene, chlorostyrene, methoxystyrene, indene and indene derivatives, and combinations thereof.

Particularly useful polymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed halogenated poly(isobutylene-co-p-methylstyrene) or brominated poly(isobutylene-co-p-methylstyrene) (BIMS). It is understood that the use of the terms "halogenated" or "brominated" are not limited to the method of halogenation of the copolymer, but merely descriptive of the copolymer which comprises the p-halomethylstyrene derived units.

These functionalized polymers preferably have a substantially homogeneous compositional distribution such that at least 95 wt % of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646, modified) is about 30 to about 60 Mooney units.

Thermoplastic Elastomer—Additional Elastomer Components

Optionally, other rubbers or elastomers can be used in combination with the halogenated isobutylene-containing elastomer. Such an optional rubber component includes high diene rubbers and their hydrates. High diene content rubbers or elastomers are also referred to as high diene monomer rubber. It is typically a rubber comprising typically at least 50 mole % of a $C_4$ to $C_{12}$ diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. Generally, other optional rubbers useful in the present embodiments include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, olefin rubbers (for example, ethylene propylene rubbers (including both EPDM and EPM)), maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

An additional rubber component that is more efficient in reducing low temperature modulus than BIMS can be advantageous for improving low temperature performance of the overall composition. Preferably, the additional rubber is based on functionalized rubbers exhibiting low glass transition temperatures, Tg, preferably less than −30° C. The low Tg contributes to reduced modulus (enhanced softness) of the additional rubber at operating or use temperatures of products containing such rubbers, for example, tire innerliners, of about −20° C. or less. Suitable functionality includes maleic anhydride, acyllactam, or others that can readily react with amine functionality present in polyamides. The presence of chemically reactive functionality in such rubbers further promotes reactive compatibilization between the additional rubber and polyamide leading to a small particle size dispersion of the rubber in the polyamide matrix, the particles exhibiting an average particle size of about 1 micron or less; preferably less than about 0.5 micron.

The additional rubber, dispersed in the polyamide matrix in the form of small particles, as noted, can optionally be cured, crosslinked or vulcanized, partially, substantially or fully, as described with regard to the halogenated or BIMS elastomer. Such crosslinking can be accomplished in the course of dispersing the additional rubber in the polyamide matrix by using the same dynamic vulcanization method applied to the halogenated elastomer component. If dynamic vulcanization is used, it is also necessary to disperse a suitable curing agent or curing system in the additional rubber in order to effect vulcanization during mixing and dispersion of the rubber.

Alternatively, if the additional rubber is susceptible to thermal crosslinking, it can be vulcanized by the application of sufficient thermal energy either during mixing and dispersion in a manner corresponding to dynamic vulcanization, or after it is dispersed in the form of small particles by providing sufficient thermal energy to accomplish such crosslinking after dispersion. In any event, it is preferred that the additional rubber be dispersed in the polyamide matrix in the form of small particles having an average particle size of about 0.1 micron to about 1 micron; for example about 0.1 micron to about 0.75 micron; or about 0.1 micron to about 0.5 micron.

Thermoplastic Elastomer—Thermoplastic Resin Component

In embodiments, a useful thermoplastic resin is defined to be any thermoplastic homopolymer, copolymer or mixture thereof having a Young's modulus of more than 500 MPa and, preferably, an air permeation coefficient of less than $60 \times 10^{-12}$ cc-cm/cm$^2$-sec-cm Hg (at 30° C.), and, preferably, a melting point of about 170° C. to about 230° C., including, but not limited to, one or more of the following:

a) polyamide resins: nylon 6 (N6), nylon 66 (N66), nylon 46 (N46), nylon 11 (N11), nylon 12 (N12), nylon 6,10 (N610), nylon 6,12 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxyalkylene diimide diacid/polybutyrate terephthalate copolymer and other aromatic polyesters;

c) polynitrile resins: polyacrylonitrile (PAN), polymethacrylonitrile, acrylonitrile-styrene copolymers (SAN), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation): ethylene vinyl acetate (EVA), polyvinyl alcohol (PVA), vinyl alcohol/ethylene copolymer (EVOA), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides);

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n) inclusive as well as mixtures of any of the illustrative or exemplified thermoplastic resins within each of a) through n) inclusive.

For purposes of the present invention, this definition of thermoplastic resin excludes polymers of olefins, such as polyethylene and polypropylene.

Preferred thermoplastic resins include polyamide resins and mixtures thereof; particularly preferred resins include Nylon 6, Nylon 6/66 copolymer, Nylon 11, Nylon 12, Nylon 610, Nylon 612 and their blends. According to an alternative preferred embodiment of the present invention, the thermoplastic elastomer composition may be formulated using a thermoplastic resin component where the nylon resin component comprises Nylon 11 or Nylon 12, and Nylon 6/66 copolymer in a ratio of composition (ratio by weight) of about 10/90 to about 90/10; preferably about 30/70 to about 85/15. Such a thermoplastic elastomer composition based on blended resins can provide a thermoplastic elastomer composition having superior durability and appearance, e.g., of the cured surface of a tire innerliner as well as superior air retention properties, as well as demonstrating a good balance of these properties.

Thermoplastic Elastomer—Other components

Since the thermoplastic resin and the halogenated isobutylene-containing rubber differ significantly in solubility, a compatibilizing ingredient may be useful for the purposes of enhancing compatibility of these polymers. Furthermore, without wishing to be bound by theory, the fine rubber dispersions obtained in the compositions of some embodiments may be the result, in part, of chemical reaction(s) between, e.g., benzylic bromine present in BIMS, or allylic halogen in halogenated butyl, and terminal amines in thermoplastic polyamides at the phase boundary between the dispersed rubber particles and the thermoplastic which are formed during mixing and potentially by modifying, in particular reducing, the surface tension between the rubber and thermoplastic resin components. The occurrence of interfacial reactions during blending and simultaneous reaction of two immiscible polymers can help to avoid coalescence of the small particle-size dispersed rubber phase, thereby leading to particularly fine dispersions of the rubber phase. At the same time, because of the interfacial stability in these reactive compatibilized immiscible systems, phase inversion of the higher concentration, lower viscosity polymer blend component, the rubber phase, is inhibited as a consequence of the stabilizing effect of interfacial compatibilization.

Secondary polymers may function as compatibilizers and can include ethylenically unsaturated nitrile-conjugated diene-based high saturation copolymer rubbers (HNBR), epoxylated natural rubbers (ENR), NBR, hydrin rubbers, acryl rubbers and mixtures thereof. Other compatibilizers include copolymers such as those having the structure of both or one of the thermoplastic resin and rubber polymer or a structure of a copolymer having an epoxy group, carbonyl group, halogen group, amine group, maleated group, oxazoline group, hydroxy group, etc., capable of reacting with the thermoplastic resin or rubber polymer. The secondary polymer can be selected based upon the type of the thermoplastic resin polymer and rubber polymer to be mixed. Such useful secondary polymers include maleic anhydride grafted rubbers such as maleic anhydride grafted acrylonitrile-butadiene-styrene, maleic anhydride grafted ethylene-propylene-diene rubber, maleic anhydride grafted styrene-ethylene/butadiene-styrene, and the like and maleated ethylene copolymer rubbers such as maleated ethylene-propylene (EPM), maleated ethylene-butene, maleated ethylene-hexene, maleated ethylene-octene, maleated ethylene-decene, maleated ethylene-propylene-diene, maleated ethylene-vinyl acetate, maleated ethylene-methyl acrylate, maleated ethylene-ethyl acrylate, maleated ethylene-acrylic acid, and the like and mixtures thereof. Also, potentially useful polymers include EPDM/styrene, EPDM/acrylonitrile graft copolymer and their maleic acid-modified forms; styrene/maleic acid copolymer; reactive phenoxy thermoplastic resin; and their mixtures.

Examples of useful, preferred functional groups present in the secondary polymer include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used. Examples of particularly preferred functional groups include, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Polymers suitable to make functionalized polymers useful herein include ethylene polymers and propylene polymers. Particularly preferred polymers include polymers of ethylene copolymerized with one or more of propylene, butene, pentene, hexene, heptene, octene, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably, such ethylene polymers are modified with maleic acid or maleic anhydride. Another class of particularly preferred polymers includes polymers of propylene copolymerized with one or more of ethylene, butene, pentene, hexene, heptene, octene, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably, such propylene polymers are modified with maleic acid or maleic anhydride.

In a preferred embodiment, the polymer to be functionalized is grafted with maleic anhydride so the maleic anhydride is covalently bonded to the backbone polymer chain of the polymer. The anhydride functionality grafted onto the polymer may remain as an anhydride, may be oxidized into acid functional groups, and/or may be further reacted by processes known in the art to introduce other functional groups such as amides, amines, alcohols, and the like.

Another class of particularly preferred polymers include polymers of a $C_4$ to $C_7$ isoolefin (such as isobutylene) copolymerized with one or more of isoprene, and isobutylene. Preferably, such isobutylene polymers are modified with maleic acid or maleic anhydride. Particularly preferred functionalized polymer include maleated copolymers of isobutylene and isoprene, maleated copolymers of isobutylene and paramethylstyrne, maleated halobutyl type copolymers, maleated SBB type copolymers and maleated BIMS type copolymers. Various methods are known in the art that may be used for functionalizing polymers. These include, but are not limited to, selective oxidation, free radical grafting, ozonolysis, epoxidation, and the like.

Preferably, the functionalized polymer comprises maleic anhydride present at a concentration selected from the group consisting of less than about: 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt % maleic anhydride. Also preferably the level of maleic anhydride (MA) in the polymer-g-MA may be greater than about 0.1 wt %, preferably greater than about 0.5 wt %, alternately greater than about 1 wt % maleic anhydride. In a preferred embodiment, the functionalized polymer may comprise about 0.1 to about 10 wt % maleic anhydride; preferably about 0.25 to about 5 wt %; more preferably about 0.5 to about 4 wt %; still more preferably about 0.75 to about 3.5 wt %; such as about 1.5 to about 2.5 wt % of maleic anhydride. The functional group content of the grafted polymer may be determined by Fourier Transform Infrared (FTIR) spectroscopy based on a calibration with standards whose absolute functional group content has been determined.

By having another rubber, the overall rubber content, counting both the primary rubber and at least one secondary or additional rubber, can be increased in the thermoplastic elastomer composition while maintaining a desirable morphology including small particle size dispersion of the rubber components in the polyamide matrix. The increase in maximum rubber content can be realized particularly in view of the restricted coalescence of the primary rubber particles when in the presence of an immiscible secondary rubber. Furthermore, by controlling the amount of the secondary rubber concentration at a low or minor level as described above, it is possible to avoid the need to cure or vulcanize the secondary rubber in order to substantially avoid or prevent its coalescence. This is particularly true since the secondary rubber is reactive in the presence of and with the polyamide and becomes substantially immobilized. Without the need to add curatives to the secondary rubber it is then unnecessary to pre-mix or to pre-compound it with curatives (although curatives can optionally be added and the secondary rubber dynamically vulcanized using the same technology as for the primary rubber), and direct addition of the secondary rubber to the extruder mixer is feasible during extrusion mixing; the secondary rubber preferably is provided in pellet form. Furthermore, since most functionalized rubbers, such as maleated ethylene copolymer rubbers and maleic anhydride grafted rubbers, are fairly permeable, it is desirable to keep the secondary rubber concentration low, typically not more than 20 wt %; preferably about 1 wt % to about 20 wt %; more preferably about 1 wt % to about 10 wt % or less, based on the total weight of the overall composition. The amount of the secondary, functionalized compatibilizer rubber blended is typically not more than about 20 wt %; preferably less than about 10 wt %; generally about 0.5 wt % to about 20 wt %; for example about 5 wt % to about 15 wt %; such as about 7.5 wt % to about 12.5 wt %.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." A cure system is used because typically more than one curing agent is employed for beneficial effects, particularly where a mixture of high diene rubber and a less reactive elastomer is used.

For purposes of dynamic vulcanization in the presence of a thermoplastic resin to form, for example, a highly impermeable layer or film, any conventional curative system which is capable of vulcanizing saturated or unsaturated halogenated polymers may be used to vulcanize at least the elastomeric halogenated polymer containing a $C_4$ to $C_7$ isomonoolefin. Dynamic vulcanization according to an embodiment can occur prior to, during and/or following coextrusion, preferably prior to or during the coextrusion step or process, and especially during coextrusion with the adhesive layer and sublayer.

Crosslinking or curing agents include at least one of, e.g., sulfur, zinc oxide, and fatty acids and mixtures thereof. Generally, polymer compositions may be crosslinked by adding curative agents, for example sulfur, metal oxides (i.e., zinc oxide, ZnO), organometallic compounds, radical initiators, etc., and heating the composition or mixture. The following are common curatives that can function in the present invention: ZnO; CaO; MgO; $Al_2O_3$; $CrO_3$; FeO; $Fe_2O_3$ and; NiO. These metal oxides can be used in conjunction with the corresponding metal stearate complex (e.g., the stearate salts of Zn, Ca, Mg, and Al), or with stearic acid, and either a sulfur compound or an alkylperoxide compound. Suitable curative systems for the elastomeric halogenated copolymer component of the present invention include zinc oxide in combination with zinc stearate or stearic acid and, optionally, one or more of accelerators or vulcanizing agents. Peroxide curatives are specifically excluded from the thermoplastic elastomer in an embodiment when there is present one or more thermoplastic resins that would cause such the resins to crosslink themselves in the presence of peroxide, resulting in an excessively cured, non-thermoplastic composition.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally, the entire available curative is consumed in the formation of effective crosslinks which join individual polymer chains to one another and enhance the overall strength of the polymer matrix. Numerous accelerators are known in the art. Curatives, accelerators and the cure systems of which they are a part that are useful with one or more crosslinkable polymers are well-known in the art.

The cure system can be dispersed in a suitable concentration into the rubber component, the rubber component optionally containing one or more filler, extender and/or plasticizer by, e.g., mixing the rubber and the cure system components in a process step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization, although this is difficult to control in a commercial, practical, integrated process and is less desirable. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization. By so doing, the precompounded rubber composition can be pelletized for more efficient and effective feeding to the dynamic vulcanization equipment, preferably a mixing extruder, as described below.

In one embodiment of the invention, at least one curing agent is typically present at about 0.1 to about 15 phr; alternatively at about 0.5 to about 10 phr.

The preferred polymer components comprise halogenated isobutylene-containing copolymers as the vulcanizable component(s), e.g., halogenated butyl such as chlorinated butyl or brominated butyl, and brominated isobutylene-p-methylstyrene copolymer (BIMS copolymer), and a thermoplastic polymer such as nylon or a blend of various nylon polymers. It is particularly preferred that the dynamically vulcanized compositions of the present invention comprise the halogenated rubber component(s) in the form of dispersed, substantially fully cured, small particles in a continuous matrix of thermoplastic. The dynamically vulcanized halogenated rubber component is preferably dispersed in the polyamide matrix in the form of small particles having an average particle size of about 0.1 micron to about 1 micron; for example about 0.1 micron to about 0.75 micron; or about 0.1 micron to about 0.5 micron. Particle size can be determined by methods well known in the art and including tapping phase atomic force microscopy (AFM).

For purposes of the present invention, the primary rubber component is also referred to as a low-grafting efficiency elastomer and the secondary rubbers are referred to as high-grafting efficiency rubbers. In each instance, grafting refers to grafting onto the polyamide(s) that are present in the composition. This distinction in efficiency and the method for measuring the performance of the polymers are described further below.

Generally, the term "dynamic vulcanization" is used to denote a vulcanization process in which a thermoplastic resin and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the resin which forms or is present as a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the resin. The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. However, the dynamic vulcanization process can be modified, as described below, in order to achieve further advantages.

It will be appreciated that the vulcanizable rubber, typically the first rubber, for example the halogenated isobutylene elastomer such as BIMS (or a mixture of such rubbers), will be cured to at least 50% of the maximum state of cure of which it is capable based on the cure system, time and temperature, and typically, the state of cure of such rubber will exceed 50% of maximum cure. Since the second rubber can also comprise a vulcanizable rubber, where such second rubber is vulcanized, for example according to dynamic vulcanization technology as described herein, it too typically will be cured to at least 50% of the maximum state of cure of which it is capable based on its curative or cure system and the time and temperature at which it is processed. Alternatively, as discussed herein, such second rubber can also be grafted, linked and/or associated with the polyamide resin, with or without the use of curatives, so that its state of cure is not a limitation, provided that it is sufficiently dispersed in a small enough particle size so as to provide the properties desired for the use to which the composition will be put. Conversely, it may be desirable to cure the rubber particles to less than the maximum state of cure of which the rubber is capable so that the flexibility, as measured, for example, by Young's modulus, of the rubber component(s) is at a suitable level for the end use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

Dynamic vulcanization can be carried out in various types of commercial equipment generally available in the rubber and plastics industry including Banbury® internal mixers, roll mixers, and mixing extruders. In an embodiment herein, the dynamic vulcanization of the barrier composition is effected during the coextrusion with the adhesive compositions in the outer adhesive layer and the adhesive sublayer, e.g., in an extruder supplying the melt to the coextrusion die. A preferred mixing device is a twin-screw extruder with intermeshing screws. Mixing is generally conducted under such time and temperature conditions that the dispersed rubber particles, particularly the first rubber component, are dispersed and cured and/or interact with the polyamide to the extent necessary to maintain their stability, i.e., to avoid coalescence of such particles at the completion of mixing the composition. A suitable range of dynamic vulcanization temperatures is typically from about the melting temperature of the resin(s) to less than about 300° C.; for example, the temperature may range from about the melting temperature of the matrix resin(s) to about 275° C.; preferably about 210° C. to about 265° C.; alternatively, about 225° C. to about 260° C.; such as about 230° C. to about 260° C.; for example, about 230° C. to about 250° C. In one embodiment, dynamic vulcanization is carried out at a temperature from about 210° C. to about 260° C. Alternatively, dynamic vulcanization can be carried out at a temperature range from about 10° C. to about 50° C. above the melting temperature of the matrix resin; more preferably about 20° C. to about 40° C. above the melting temperature of the polyamide or mixed polyamide thermoplastic matrix.

The thermoplastic elastomer composition thus obtained is structured with the elastomer component forming a discontinuous phase dispersed as a dispersion phase (domain) in a matrix of the nylon resin which forms a continuous phase. As a consequence of dynamic vulcanization, the composition remains thermoplastic and a film, layer or sheet like structure of the composition can be formed into a laminate.

By molding the thermoplastic elastomer composition obtained into a sheet, film, or tube using a T-sheeting die, straight or crosshead structure tubing die, inflation molding cylindrical die, etc., at the end of a single-screw extruder, or by calendering, it is possible to use the composition as an air permeation preventive layer.

The sheet or tubular molded article thus obtained can be effectively used for an innerliner layer of a pneumatic tire or a layer in a hose such as a low gas permeable hose, or a layer in other articles wherein low permeability is desired, such as air spring, bellows, bladders, etc. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

Adhesive Layer and Sublayer

To assist the DVA film or layer in bonding with adjacent layers in an article, an adhesive layer may be applied to the surface of the film or layer. In accordance with the present invention, the adhesive layer is co-extruded with the DVA wherein an adhesive outer layer and an adhesive sublayer are formed adjacent to the DVA. The adhesive compositions of the outer adhesive layer and the adhesive sublayer can be the same or different.

In an embodiment, the total thickness of the outer adhesive layer and the adhesive sublayer is up to 600 μm, and in another embodiment up to 200 μm, e.g., from 5 to 200 μm, preferably 100 μm or less, preferably 5 to 70 μm, more preferably 10 to 50 μm. In one embodiment, the outer adhesive layer and the sublayer each have a thickness of from 5 to 25 microns, i.e., a total thickness from 10 to 50 μm.

The adhesive compositions for the outer layer and the sublayer are selected based on the ability of the adhesives to bond the DVA sheet/film to an adjacent layer—the bond being either a chemical or a chemical/mechanical bond. In one embodiment, the adhesive composition of the outer adhesive layer and/or the adhesive sublayer comprises a thermoplastic elastomer and a tackifier. In an embodiment, the adhesive composition generally comprises a total of 100 parts by weight of a thermoplastic elastomer and from 30 to 200 parts by weight, preferably 40 to 120 parts by weight of a tackifier, and optionally, from 0.1 to 15 parts by weight, preferably 0.5 to 10 parts by weight of a cure agent.

The composition of the outer adhesive layer in one embodiment has a self tack of less than 5N, preferably 1 to 4N. In one embodiment, the outer adhesive layer can have a tack to an unvulcanized diene-based rubber of 5N or more, preferably 7 to 20N. Tack is tested as disclosed in U.S. Patent No. 2007/031661, i.e., by attaching a 1-cm wide strip of the laminate to the ring part of a commercial tack tester, and pressing the adhesive side perpendicularly with a force of 4.9 N for not more than 1 second against a 10 cm square piece cut from the same sheet in the case of self tack and against the unvulcanized rubber member in the case of tack to the unvulcanized rubber. The force when peeling the pieces apart is recorded as the tack. The test is conducted at a peeling speed of 120 mm/min at 20° C.

In an embodiment, the thermoplastic elastomer can comprise a mixture of any thermoplastic resin and any elastomer, including those mentioned above for the barrier composition. In one embodiment, the adhesive composition comprises as the matrix polymer any of various styrene-butadiene-based block copolymers (SBS), various styrene-isoprene block (SIS) copolymers, and their partial hydrogenates, including mixtures and combinations thereof, etc. In one embodiment, the adhesive composition, preferably at least in the adhesive sublayer, comprises an epoxy-modified, i.e., epoxylated SBS (ESBS) having an oxirane oxygen functionality. This epoxy modification may be carried out by epoxylating, for example, a styrene-butadiene-based block copolymer (SBS) using peracids, hydroperoxides or the like. As peracids, performic acid, peracetic acid, perbenzoic acid, trifluoroperacetic acid, etc., may be mentioned. Further, as hydroperoxides, hydrogen peroxide, t-butyl hydroperoxide, cumene peroxide, etc., may be mentioned. If the oxirane oxygen content of the ESBS thus obtained is too low, the bondability of the sublayer with the thermoplastic elastomer layer is liable to deteriorate, and therefore, this is not preferred, while conversely if it is too high in the adhesive outer layer, the bondability with the tire rubber is liable to deteriorate, and therefore, this is not preferred.

In one embodiment, the adhesive composition of the sublayer comprises ESBS with an oxirane oxygen content effective to bond with the thermoplastic elastomer layer, and the adhesive composition of the outer layer has a lower oxirane oxygen content than the sublayer. In a further embodiment the adhesive composition of at least the outer layer comprises a curing agent in an amount effective for co-curing with a diene rubber with which it is placed in contact, e.g., in the adhesion of the film as an innerliner onto the rubber surface of a tire carcass, and the adhesive composition of the sublayer has a relatively lower loading of the curing agent, e.g., organic peroxide. In one embodiment, the adhesive composition of the sublayer and/or the adhesive outer layer comprises a total of 100 parts by weight of the thermoplastic elastomer wherein the thermoplastic elastomer contains at least 50 parts by weight of the ESBS, preferably 60 to 100 parts by weight, so that an oxirane oxygen content becomes 1 to 5% or 1 to 3% by weight, preferably 1.2 to 2.8% by weight, by weight of the layer or sublayer.

The adhesive composition according to the present invention may contain any suitable tackifier. In one embodiment, the tackifier is selected from aliphatic resins such as, for example, piperylene resins and terpene resins, and aromatic modified aliphatic resins, as well as combinations thereof, and the like. Suitable tackifiers herein are commercially available under the trade designations ESCOREZ (ExxonMobil Chemical Co.), e.g., ESCOREZ 1102, ESCOREZ 1310, ESCOREZ 1315; and YS Resin (Yasuhara Chemical), e.g., YS Resin D105.

In an embodiment, the tackifier comprises a piperylene resin having a softening point from 70° C. to 140° C. and a number average molecular weight Mn from 800 to 1600.

In another embodiment, the tackifier comprises a specific terpene resin (A) or a mixture of a terpene resin (A) and an aromatically modified terpene resin (B). In one embodiment, the terpene resin (A) and the terpene resin (B) have a weight average molecular weight Mw of 1000 or less and a softening point of 60° C. to 120° C. Here, "terpene" is the general term for the series of compounds having isoprene units. A "terpene resin" is a homopolymerized or copolymerized product mainly composed of oil obtained from pine tree resin or citrus fruit peel (e.g., α-pinene, β-pinene, dipentene (limonene), etc.). The terpene resin (A) usable in the present invention is preferably a copolymer of β-pinene and dipentene or a homopolymer of dipentene. The aromatically modified terpene resin (B) can be produced by causing the terpene resin (A) to co-condense with a phenol, alkylphenol, etc. A commercially available product may also be used. The amount of the aromatic modification of the aromatically modified terpene resin (B) is not particularly limited, but preferably is about 1 to 20% by weight based upon the weight of the terpene resin.

The ratio of the terpene-based resin (A) to the aromatically modified terpene resin (B) in the present invention may be changed according to the working environmental conditions (e.g., temperature, humidity, etc.) and the degree of tack of the tire members. If the ratio of the terpene resin is greater, the self tack and the tack to metal or vulcanized rubber are decreased and the workability is improved, while conversely if the ratio of the aromatically modified terpene resin is greater, the tack with the unvulcanized tire member is improved. In an embodiment, the present inventors found that, if (A):(B) is made 100:0 to 50:50 (weight ratio), preferably 100:0 to 70:30, a good balance thereof can be obtained.

The adhesive composition according to an embodiment may optionally contain therein, preferably at least in the outer adhesive layer when present, for further adjusting the tack, an internal mold release agent in an amount of 0.1 to 3 parts by weight, preferably 0.1 to 1 part by weight, based upon the total 100 parts by weight of the thermoplastic elastomer. As the internal mold release agent, for example, the generally used stearic acid or oleic acid and their metal salts etc. may be used. By compounding an internal mold release agent in this way, it is possible, in particular, to lower the self tack of the outer adhesive layer. By suitably adjusting the compounded amount when adjusting the tack so as to correspond to the changes in an air temperature etc., it is possible to maintain the optimal state of tack.

In one embodiment, at least one curing agent is typically present in the adhesive composition, preferably at least in the outer adhesive layer, in an amount of from about 0.1 to about 15 parts per 100 parts by weight of the thermoplastic elastomer in the adhesive composition; alternatively from about 0.5 to about 10 parts per 100 parts by weight of the thermoplastic elastomer in the adhesive composition.

Any of the crosslinking or vulcanization cure packages mentioned above may be used in the adhesive compositions, e.g., sulfur, zinc oxide, and fatty acids and mixtures thereof; metal oxides (i.e., zinc oxide, ZnO), organometallic compounds, radical initiators, etc.; ZnO, CaO, MgO, $Al_2O_3$, $CrO_3$, FeO, $Fe_2O_3$, and NiO and the corresponding metal stearate complex (e.g., the stearate salts of Zn, Ca, Mg, and Al), or with stearic acid, and either a sulfur compound or an alkylperoxide compound. Suitable vulcanization cure packages for the adhesive compositions of one embodiment of the present invention include zinc oxide in combination with zinc stearate or stearic acid and, optionally, one or more of accelerators or vulcanizing agents. Curative accelerators include amines, guanidines, thioureas, thiazoles, thiurams, sulfenamides, sulfenimides, thiocarbamates, xanthates, and the like.

In one embodiment, as the cross-linking agent, an organic peroxide having a one-minute half-life temperature of 160° C. or more, preferably 165° C. to 190° C., is used for the crosslinking in an amount of 0.1 to 2 parts by weight, preferably 0.3 to 1 part by weight. As such an organic peroxide, specifically, for example, dicumyl peroxide, di-t-butyl peroxide, t-butylcumyl peroxide, benzoyl peroxide, 2,5-dimethyl-2,5-di(t-butylperoxy)hexine-3,2,5-dimethyl-2,5-di(t-butylperoxy)hexane, 1,3-bis(t-butylperoxyisopropyl)benzene, 4,4-di-t-butylperoxy-valerenate-n-butyl ester, etc., may be used.

According to an embodiment of the present invention, the adhesive composition in the adhesive layer and sublayer can be placed between the thermoplastic elastomer composition in the barrier layer and a diene-based rubber, e.g., in a tire carcass, to form a laminate for use for a pneumatic tire.

Therefore, there is provided a laminate of an air permeation preventive layer/an adhesive formed integrally in a cylindrical (tubular) shape with the air permeation preventive layer of the thermoplastic elastomer composition composed of a thermoplastic resin as a continuous phase and a rubber composition as a dispersed phase facing the tire interior and the adhesive composition radially outward of the air permeation prevention layer providing bonding with a tire carcass.

As the diene-based rubber, any diene-based rubber usable for a tire, including those mentioned above, for example, natural rubber (NR), polyisoprene rubber (IR), various types of styrene-butadiene copolymer rubber (SBR), various types of polybutadiene rubber (BR), acrylonitrile-butadiene copolymer rubber (NBR), and further an ethylene-propylene-diene copolymer (EPDM), (halogenated) butyl rubber, etc., may be mentioned. These may be used alone or in any blend thereof.

Both the DVA and adhesive compositions described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black, and the like. Reinforcing grade carbon black is preferred. A particularly useful grade of carbon black is Mitsubishi Carbon Black grade MA600, also identified as a medium color furnace black. However, carbon black, if used at all, is typically no more than about 5 parts per hundred of rubber (phr); preferably less than about 4 phr; more preferably less than about 3 phr; most preferably less than about 2 phr; for example, about 1 phr or less, such as about 0.1 to about 1.5 phr; for example about 0.25 to about 1.0 phr. In one embodiment, carbon black can be added to the adhesive layer and/or sublayer as a masterbatch, e.g., in a carrier resin such as polyethylene. Alternatively, useful compositions can be prepared without carbon black. The filler may also include other reinforcing or non-reinforcing materials such as silica, clay, calcium carbonate, talc, titanium dioxide and the like. The filler may be present at a level of from 0 to about 5 percent by weight of the rubber present in the composition; such as about 0.5 to about 4 wt %; or about 1.0 to about 3 wt %; such as about 1 to about 2 wt %.

Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl), tetrakis-(methylene-(3,5-di-(tert)-butyl-4-hydrocinnamate)) methane (IRGANOX 1010), etc. Examples of hindered phenolic antioxidants are commercially available under the IRGANOX series of trade designations including IRGANOX 565, IRGANOX 1010 and IRGANOX 1076 from Ciba Specialty Chemicals (Basel, Switzerland). In one embodiment, the adhesive composition comprises from 0.01 to 3 wt % of total antioxidant on an active or neat basis (excluding inerts in as-received commercially available antioxidant packages, and including any antioxidant in the blend components such as SBS), preferably from 0.05 to 2 wt %.

A process or plasticizer oil may be present in the compositions. Such oils are primarily used to improve the processing of the composition during preparation of the layer, e.g., mixing, calendering, etc. Generally, the process oil may be selected from paraffinic oils, aromatic oils, naphthenic oils, and polybutene oils. Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist will recognize which type of oil should be utilized with a particular rubber in a particular application. For a thermoplastic elastomer composition the oil may be present at a level of 0 to about 20 wt % of the total composition; preferably oil is not included in order to maximize impermeability of the composition.

With reference to FIG. 1, an extruder line schematic is shown for carrying out the process of the invention according to one non-limiting embodiment. Extruders 1, 2, 3, 4, 5 feed melt streams to the stack die 6, which forms an inflated bubble 7 extending to the guide tent 8 where it is taken up at the nip rolls 9, from which the webbing 10 is wound onto windup roll 11. In an embodiment, the barrier composition is supplied via extruders 1, 2, 3, the first adhesive composition for the sublayer via extruder 4, and the second adhesive composition for the outer adhesive layer via extruder 5.

In an embodiment, the barrier composition is supplied at a temperature above the melt temperature of the thermoplastic phase thereof, e.g., above 180° C., above 190° C., above 200° C., or above 210° C., and in one embodiment, the melt has a sufficiently high temperature for dynamic vulcanization in the melt extruder. In another embodiment, the barrier composition is supplied at a temperature from about 190° C. to about 250° C., e.g., from about 210° C. to about 230° C. Generally, a lower temperature is preferred to avoid overheating the adhesive layer and/or sublayer during the coextrusion therewith. On the other hand, the temperature should be sufficiently high to ensure flowability of the melt in the die and onto the mandrel, and activation of any curing system present in the barrier composition.

In an embodiment, the adhesive composition is exiting the extruders at a temperature that is sufficient to ensure flowability in the coextrusion step, e.g., through the die and/or onto a surface of the barrier composition around any mandrel that may be present, e.g., in the case of a blown film; however, the temperature should also be sufficiently low to avoid prematurely curing or scorching of the adhesive composition. It is to be expected that the sublayer generally experiences a greater thermal history than the outer layer as it is in contact with a surface of the barrier composition and is subject to heat transfer with the barrier composition at the surface; the adhesive outer layer deposited over the sublayer will have a relative reduced thermal history in comparison to the sublayer.

In an embodiment, the adhesive composition supplied to the adhesive layer and sublayer is from a melt at a temperature from about 110° C. to about 180° C., for example, from about 120° C. to about 150° C. In a further embodiment, the adhesive in the sublayer is maintained during the coextrusion step at a temperature below about 210° C., preferably below about 180° C., and especially less than 160° C.; whereas the adhesive in the outer adhesive layer is maintained during the coextrusion step at a temperature below about 180° C., preferably below about 160° C., and especially less than 140° C.

Figure 2:
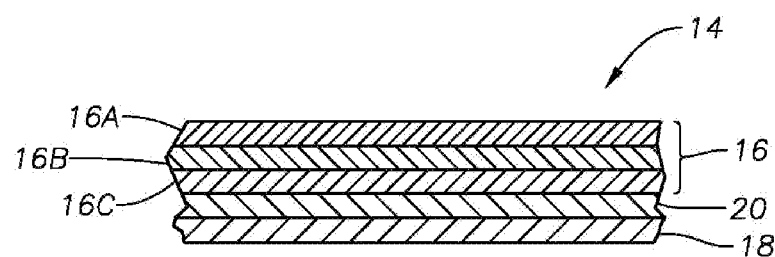
FIG. 2 is a cross section of a laminate according to an embodiment.

FIG. 2 shows a schematic cross section of the laminate 14 produced from the extruder line of FIG. 1, according to an embodiment. The air barrier layer 16 comprises three plies 16A, 16B, 16C, according to one embodiment, although in theory any suitable number of plies are possible, for example, 1, 2, 3, 4, 5, 7, 8, and 9 plies, and so on. The adhesive layer 18 is adhered to the air barrier layer 16 by means of the sublayer 20, which also comprises an adhesive composition as described in various embodiments herein.

Figure 3:
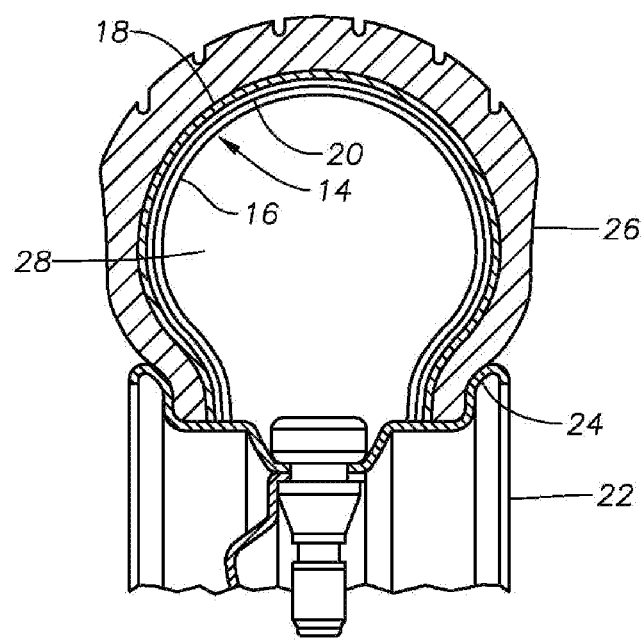
FIG. 3 is a cross section of a tire incorporating the laminate of FIG. 2 as an innerliner according to an embodiment.

FIG. 3 shows a schematic cross section of a pneumatic tire (not to proper scale) in which tire 26 is mounted on the rim 24 of a tire wheel 22 thereby forming an enclosed air chamber 28. The laminate 14 (see FIG. 2) has been applied as an innerliner, with adhesive layer 18 co-vulcanized with the tire carcass and the air barrier layer 16 facing the air chamber 28.

Accordingly, the present invention provides the following embodiments of the invention:

A. A process, comprising: supplying respective melt streams of a barrier composition and first and second adhesive compositions, wherein the first and second adhesive compositions are the same or different; coextruding the melt streams to form a laminated extrudate comprising a plurality of layers comprising an adhesive layer, a sublayer and a barrier layer; wherein the barrier composition comprises a dynamically vulcanized thermoplastic elastomer composition present in one or more plies of the barrier layer; and wherein the sublayer comprises a first ply formed from the melt stream of the first adhesive composition, wherein the adhesive layer comprises a second ply formed from the melt stream of the second adhesive composition, wherein the first ply adhesively joins the barrier layer and the second ply, and wherein the second ply is vulcanizable with diene-based rubber.

B. The process of embodiment A, wherein the melt stream of the barrier composition is supplied at a temperature of from 210° C. to 260° C., wherein the melt stream of the first adhesive composition is supplied at a temperature less than 210° C., and wherein the melt stream of the second adhesive composition is supplied at a temperature less than 180° C.

C. The process of embodiment A or embodiment B, wherein the melt stream of the first adhesive composition is supplied at a temperature less than the temperature of the melt stream of the barrier composition and greater than the temperature of the melt stream of the second adhesive composition.

D. The process of any one or any combination of embodiments A to C, wherein the sublayer is at least partially cured and the adhesive layer is undercured.

E. The process of any one or any combination of the preceding embodiments A to D, further comprising: introducing the melt streams onto a mandrel in a die stack in a sequence wherein the melt stream of the barrier composition is introduced onto the mandrel; the melt stream of the first adhesive composition onto the barrier composition steam; and the melt stream of the second adhesive composition onto the first adhesive composition stream.

F. The process of any one or any combination of the preceding embodiments A to E, wherein the thermoplastic elastomer composition in the barrier layer comprises a thermoplastic resin comprising a polyamide, as a continuous phase, and a rubber composition dispersed therein, as a dispersed phase, wherein the rubber composition comprises a halogenated copolymer of isobutylene and paramethylstyrene.

G. The process of any one or any combination of the preceding embodiments A to F, wherein the adhesive layer comprises a vulcanization cure package.

H. The process of any one or any combination of the preceding embodiments A to G, wherein the sublayer is free of a vulcanization cure package or comprises less vulcanization cure package than the adhesive layer.

I. The process of any one or any combination of the preceding embodiments A to H, wherein the adhesive layer has a self-tack of less than 5N.

J. The process of any one or any combination of the preceding embodiments A to I, wherein the adhesive layer and sublayer have a total thickness of from 5 to 200 microns.

K. The process of any one or any combination of the preceding embodiments A to J, wherein the first adhesive composition comprises a total of 100 parts by weight of a thermoplastic elastomer component, and from 30 to 200 parts by weight of a tackifier component, wherein the sublayer is co-cured with the barrier layer.

L. The process of embodiment K, wherein the tackifier component in the first adhesive composition comprises a resin selected from the group consisting of aliphatic resins, aromatic modified aliphatic resins and combinations thereof; preferably a resin selected from the group consisting of piperylene resins, aromatic modified piperylene resins, terpene resins, aromatic modified terpene resins, and combinations thereof; more preferably a piperylene resin having a softening point from 70° C. to 140° C. and a number average molecular weight Mn from 800 to 1600, or a terpene resin having a weight average molecular weight Mw of 1000 or less and a softening point of 60° C. to 120° C.

M. The process of any one or any combination of the preceding embodiments A to L, wherein the second adhesive composition comprises a total of 100 parts by weight of a thermoplastic elastomer component, from 30 to 200 parts by weight of a tackifier component, and from 0.1 to 15 parts by weight of a vulcanization cure package per 100 parts by weight of the thermoplastic elastomer component.

N. The process of embodiment M, wherein the tackifier component in the second adhesive composition comprises wherein the tackifier component in the first adhesive composition comprises a resin selected from the group consisting of aliphatic resins, aromatic modified aliphatic resins and combinations thereof; preferably a resin selected from the group consisting of piperylene resins, aromatic modified piperylene resins, terpene resins, aromatic modified terpene resins, and combinations thereof; more preferably a piperylene resin having a softening point from 70° C. to 140° C. and a number average molecular weight Mn from 800 to 1600, or a terpene resin having a weight average molecular weight Mw of 1000 or less and a softening point of 60° C. to 120° C.

O. A laminate comprising the laminated extrudate produced according to the process of any one or any combination of the embodiments A to N, wherein the barrier layer is dynamically vulcanized and the adhesive layer is co-curable with diene-based rubber.

P. The process of any one or any combination of the embodiments A to O, further comprising incorporating the laminated extrudate into a tire as an innerliner.

Q. A pneumatic tire produced according to the process of embodiment P, wherein the adhesive layer of the laminated extrudate is co-cured with a rubber.

R. A laminate, comprising: a plurality of layers comprising an adhesive layer, a sublayer and a barrier layer; wherein the barrier layer comprises a dynamically vulcanized thermoplastic elastomer composition present in one or more plies of the barrier layer; wherein the sublayer comprises a first ply of a first adhesive composition adhesively joining the barrier layer and a second ply; wherein the adhesive layer comprises the second ply formed of a second adhesive composition, wherein the second ply is vulcanizable with diene-based rubber.

S. A laminate according to embodiment R, wherein the adhesive layer has a self-tack of less than 5N.

T. A laminate according to either embodiment R or S, wherein the adhesive layer and the sublayer have a total thickness of from 5 to 200 microns.

U. The laminate of any one or any combination of the embodiments R to T, wherein the adhesive layer comprises a vulcanization cure package.

V. The laminate of any one or any combination of the embodiments R to U, wherein the sublayer is free of the vulcanization cure package or comprises less of the vulcanization cure package than the adhesive layer, and wherein the adhesive layer is free of oxirane oxygen, e.g., less than 1 or less than 0.1% by weight, or comprises less oxirane oxygen than the sublayer.

W. The laminate of any one or any combination of the embodiments R to V, wherein the thermoplastic elastomer composition in the barrier layer comprises a thermoplastic resin comprising a polyamide, as a continuous phase, and a rubber composition dispersed therein, as a dispersed phase, wherein the rubber composition comprises a halogenated copolymer of isobutylene and paramethylstyrene.

Examples

The following compounds were used for the components employed in the Examples:

TABLE 1

| Material Designation | Material | Commercial Name/Potential Source (if applicable) |
|---|---|---|
| BIMS | brominated poly(isobutylene-co-paramethylstyrene) | |
| N6 | Nylon 6 | UBE 1030B; Ube |
| N6/66 | Nylon 6/66 copolymer | UBE 5033B; Ube |
| N11 | Nylon 11 | BESN; Atochem |
| ESBS | Epoxylated SBS | EPOFRIEND AT501; Daicel Chemical |
| Plasticizer | N-butylsulfonamide | Uniplex ® 214, Unitex Chemical Corporation |
| ZnO | Zinc oxide | KADOX 911 or 920; Horsehead Corporation |
| CaCO3 | Calcium carbonate | |
| Stearic acid | Stearic acid | F1000 |
| Zinc Stearate | Zinc stearate | Zinc Stearate D |
| TBZTD | Tetrabenzylthiuram disulfide | |
| MEEA | Maleated ethylene ethyl acrylate | AR201; Mitsui-DuPont |
| MAE | Maleic anhydride functionalized ethylene copolymer | EXXELOR 1840; ExxonMobil Chemical |
| D105 | Terpene resin, softening point 105° C. | YS Resin D105; Yasuhara Chemical |
| Talc | Talc | SG-2000; Nippon |
| I1010 | Antioxidant | IRGANOX 1010; Ciba Specialty Chemicals |
| I1076 | Antioxidant | IRGANOX 1076; Ciba Specialty Chemicals |
| I3052 | Antioxidant | IRGANOX 3052; Ciba Specialty Chemicals |

A standard composition, subsequently referred to as the BIMS masterbatch, containing the ingredients in Table 2 was prepared by dispersing the ingredients in a Banbury internal mixer at a temperature and for a time that did not cause premature curing of the BIMS, but instead dispersed the ingredients, which in combination comprise a cure system for the elastomer for use in the barrier composition.

TABLE 2

| Ingredients | Parts by weight | Parts per hundred rubber (phr) |
|---|---|---|
| Stearic Acid | 0.787 | 0.600 |
| Zinc Stearate | 0.393 | 0.300 |
| ZnO | 0.195 | 0.149 |
| BIMS | 128.15 | 100 |

A DVA formulation was prepared as shown in Table 3.

TABLE 3

| Ingredients | Weight percent |
|---|---|
| BIMS | 49 |
| Curative/Stabilizer | 3 |
| MEAA | 5 |

TABLE 3-continued

| Ingredients | Weight percent |
|---|---|
| N6/66 | 30 |
| Plasticizer | 13 |

An adhesive formulation was prepared containing the ingredients of Table 4 by dispersing the ingredients in a Banbury internal mixer at a temperature and for a time that did not cause premature curing of the ESBS, but instead dispersed the ingredients, which in combination comprise a cure system for the elastomer for use in the adhesive outer layer and sublayer.

TABLE 4

| Ingredients | Parts by weight | Parts per hundred rubber (phr) |
|---|---|---|
| ESBS | 62.47 | 100 |
| D105 | 15.62 | 25 |
| ZnO | 3.12 | 5 |
| CaCO3 | 15.62 | 25 |
| Stearic acid | 0.94 | 1.5 |
| TBZTD | 1.95 | 3.125 |
| I1010 | 0.12 | 0.2 |
| I1076 | 0.09 | 0.14 |
| I3052 | 0.07 | 0.11 |

Multilayer blown films were fabricated from the DVA formulation (Table 3) and the adhesive of Table 4. The extruder line used a Brampton Engineering 5-layer die stack and 5 respective 50-mm single screw extruders arranged as shown in FIG. 1. In the first run, the three inner layers were DVA (extruders/dies A, B and C), the fourth extruder/die (D) was not used and the adhesive was supplied from the fifth extruder/die (E) as the outermost layer. The operating conditions are listed in Table 5.

TABLE 5

| Extruder Die | Material | Motor Load, % | Pressure, MPa (psig) | Rate, kg/h | Melt T, °C. | Die Layer Set Point, °C. | Die Layer T, °C. | Gauge, μm |
|---|---|---|---|---|---|---|---|---|
| E | Adhesive (Table 4) | 79 | 26.8 (3887) | 4.8 | 121 | 163 | 163 | 25 |
| D | None | 0 | 1.90 (276) | 0 | | 190 | 190 | 0 |
| C | DVA (Table 3) | 41 | 37.5 (5444) | 14.1 | 213 | 210 | 211 | 75 |
| B | DVA (Table 3) | 67 | 33.9 (4912) | 5.4 | 211 | 210 | 210 | 31 |
| A | DVA (Table 3) | 87 | 30.2 (4380) | 10.7 | 217 | 210 | 209 | 39 |

In the first run, DVA was supplied with the three inner extruders A-C at standard temperatures, leaving extruder D empty as a thermal insulation and supplying adhesive via extruder E near the die to see if a lower residence time would reduce the time of high temperature exposure and minimize scorching potential of the adhesive. However, the adhesive was scorched and the laminate had a poor surface quality, indicating that cured adhesion could be adversely impacted. Also, it was difficult to maintain adequate adhesive thickness with the take-up rate required to maintain bubble stability.

In a second run, the adhesive was supplied via the fourth and fifth extruders using the conditions listed in Table 6.

and no scorching, despite the relatively longer residence time of the adhesive sublayer relative to the first run. The sublayer of adhesive supplied via extruder D was able to act as a thermal barrier to the outer layer via extruder E, while the outer adhesive layer in turn provided a quench for the sublayer. In addition, the two-layer adhesive facilitated a control of the thickness of each of the adhesive outer layer and adhesive sublayer between 25 and 50 microns, for a total adhesive thickness of 66.7 μm in this particular embodiment.

In another exemplary run, the adhesive was also supplied via the fourth and fifth extruders using the conditions listed in Table 7; the gauge of the outer adhesive layer was increased relative to the sublayer.

TABLE 6

| Extruder Die | Material | Motor Load, % | Pressure, MPa (psig) | Rate, kg/h | Melt T, °C. | Die Layer Set Point, °C. | Die Layer T, °C. | Gauge, μm |
|---|---|---|---|---|---|---|---|---|
| E | Adhesive (Table 4) | 79 | 34.3 (4975) | 6.2 | 123 | 140 | NA | 29.8 |
| D | Adhesive (Table 4) | 76 | 33.2 (4820) | 7.7 | 140 | 140 | NA | 36.9 |
| C | DVA (Table 3) | 39 | 34.7 (5032) | 12.2 | 211 | 210 | NA | 58.8 |
| B | DVA (Table 3) | 73 | 39.2 (5692) | 6.8 | 212 | 210 | NA | 22.5 |
| A | DVA (Table 3) | 85 | 28.3 (4101) | 10.4 | 214 | 210 | NA | 34.6 |

Note for Table 6:
NA = data not available

In this run, the results were surprising in that the outer adhesive layer was clear, there was a good surface appearance

TABLE 7

| Extruder Die | Material | Motor Load, % | Pressure, MPa (psig) | Rate, kg/h | Melt T, °C. | Die Layer Set Point, °C. | Die Layer T, °C. | Gauge, μm |
|---|---|---|---|---|---|---|---|---|
| E | Adhesive (Table 4) | 79 | 30.2 (4380) | 6.9 | 123 | 140 | 156 | 37.6 |
| D | Adhesive (Table 4) | 67 | 22.3 (3234) | 6.2 | 142 | 140 | 162 | 33.4 |
| C | DVA (Table 3) | 37 | 40.0 (5802) | 9.9 | 212 | 210 | 211 | 53.7 |
| B | DVA (Table 3) | 71 | 34.5 (5004) | 6.4 | 213 | 210 | 211 | 23.8 |
| A | DVA (Table 3) | 86 | 27.8 (4032) | 9.6 | 212 | 210 | 209 | 36.1 |

In this run, the outer adhesive layer was also clear, there was a good surface appearance and no scorching, despite the relatively longer residence time of the adhesive sublayer relative to the first run. The sublayer of adhesive supplied via extruder D was again able to act as a thermal barrier to the outer layer via extruder E, while the outer adhesive layer in turn provided a quench for the sublayer. In addition, the two-layer adhesive facilitated a control of the total adhesive thickness of the outer layer and sublayer 71 microns in this particular embodiment.

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited.

All documents described herein are incorporated by reference, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A process comprising:
supplying at least respective melt streams of a barrier composition, a first adhesive composition, and a second adhesive composition, wherein the barrier composition is a dynamically vulcanized thermoplastic elastomer and the first and second adhesive compositions are the same or different and wherein the melt stream of the barrier composition is supplied at a temperature of from 210° C. to 260° C., wherein the melt stream of the first adhesive composition is supplied at a temperature less than 210° C., and wherein the melt stream of the second adhesive composition is supplied at a temperature less than 180° C. and the melt stream of the first adhesive composition is supplied at a temperature greater than the temperature of the melt stream of the second adhesive composition;
co-extruding the melt streams to form a multi-layered extrudate comprising a plurality of layers wherein the co-extruding partially cures the first adhesive composition and undercures the second adhesive composition; and
wherein the multi-layered extrudate has a barrier ply formed from the barrier composition, a first ply of the first adhesive composition, and a second ply of the second adhesive composition wherein the first ply directly adhesively joins the barrier ply and the second ply.

2. The process of claim 1, further comprising:
introducing the melt streams onto a mandrel in a die stack in a sequence wherein the melt stream of the barrier composition is introduced onto the mandrel, the melt stream of the first adhesive composition onto the barrier composition stream, and the melt stream of the second adhesive composition onto the first adhesive composition stream.

3. The process of claim 1, wherein the thermoplastic elastomer composition in the barrier ply comprises a thermoplastic resin comprising a polyamide, as a continuous phase, and a rubber composition dispersed therein, as a dispersed phase, wherein the rubber composition comprises a halogenated polymer of a $C_4$ to $C_7$ isoolefin.

4. The process of claim 1, wherein the second adhesive composition comprises a vulcanization cure package.

5. The process of claim 4, wherein the first adhesive composition is free of the vulcanization cure package or comprises less vulcanization cure package than the second adhesive composition.

6. The process of claim 1, wherein the second ply has a self-tack of less than 5N.

7. The process of claim 1, wherein the first and second ply have a total thickness of from 5 to 200 microns.

8. The process of claim 1, wherein the first adhesive composition comprises a total of 100 parts by weight of a thermoplastic elastomer component and from 30 to 200 parts by weight of a tackifier component.

9. The process of claim 8, wherein the tackifier component comprises a resin selected from the group consisting of aliphatic resins, aromatic modified aliphatic resins and combinations thereof.

10. The process of claim 1, wherein the second adhesive composition comprises a total of 100 parts by weight of a thermoplastic elastomer component, from 30 to 200 parts by weight of a tackifier component, and from 0.1 to 15 parts by weight of a vulcanization cure package per 100 parts by weight of the thermoplastic elastomer component.

11. The process of claim 10, wherein the tackifier component comprises a resin selected from the group consisting of aliphatic resins, aromatic modified aliphatic resins and combinations thereof.

12. The process of claim 1, further comprising incorporating the multi-layered extrudate into a tire as an innerliner.

* * * * *